US005614592A

United States Patent [19]
van Drunen et al.

[11] Patent Number: 5,614,592
[45] Date of Patent: Mar. 25, 1997

[54] FILLER-FREE PEROXIDE MASTERBATCH AND PROCESS FOR MAKING IT

[75] Inventors: Rudolph van Drunen; Frans J. van Moorsel, both of Deventer, Netherlands

[73] Assignee: Akzo Nobel N.V., Arnhem, Netherlands

[21] Appl. No.: 556,960

[22] PCT Filed: Jun. 3, 1994

[86] PCT No.: PCT/EP94/01812

§ 371 Date: Mar. 5, 1996

§ 102(e) Date: Mar. 5, 1996

[87] PCT Pub. No.: WO94/29372

PCT Pub. Date: Dec. 22, 1994

[30] Foreign Application Priority Data

Jun. 15, 1993 [EP] European Pat. Off. ............ 93201710

[51] Int. Cl.$^6$ ............ C08L 23/16; C08L 65/00; C08J 3/22; C08J 3/20
[52] U.S. Cl. ............ 525/193; 525/194; 525/240; 525/242
[58] Field of Search ................. 525/193, 194, 525/240, 242

[56] References Cited

U.S. PATENT DOCUMENTS

| | | | |
|---|---|---|---|
| 4,342,844 | 8/1982 | Torenbeek et al. | 525/387 |
| 4,397,992 | 8/1983 | Johansson et al. | 525/305 |
| 4,737,547 | 4/1988 | White | 525/153 |
| 4,808,442 | 2/1989 | Johannes et al. | 427/393 |

FOREIGN PATENT DOCUMENTS

| | | | |
|---|---|---|---|
| 0227048A2 | 7/1987 | European Pat. Off. | C08K 5/14 |
| 0508056A1 | 10/1992 | European Pat. Off. | C08L 19/00 |

OTHER PUBLICATIONS

Diederich K.M. Vestenamer—ein ungewöhnlicher Kautschuk mit vielfältigen Möglichkeiten (contains English summary), *Kautschuk & Gummi Kunststoffe*, Nov. 1989, Sonderdruck 44.07.010.

Kautschuk & Gummi Kunststoffe, 34, Nr 3/1981, pp. 185-90.

Kautschuk & Gummi Kunststoffe, vol. 42, No. 12, Dec. 1989, pp. 1130-1140, with Technical Brochure in English entitled: Vestenamer—an unusual rubber with versatile possiblities.

*Elastomeric Composition*, Research Disclosure 33511, Mar. 1992.

International Search Report, date Sep. 2, 1994.

Dräxler, Marl A., *Kautschuk & Gummi Kunststoffe* 42, Nr 10/89, pp. 868–874 contains English summary.

Derwent Abstract No. 88-326882 of JP 63 241 051.

*Primary Examiner*—Irina Zemel
*Attorney, Agent, or Firm*—Ralph J. Mancini; Louis A. Morris

[57] ABSTRACT

A process for the production of a peroxide masterbatch composition comprising the steps of: a) providing a mixture of an ethylene-propylene copolymer and 10–150 parts by weight, based on the weight of the ethylene-propylene copolymer of a polyoctenamer rubber to a mixing device, (b) adjusting the temperature of the mixture to a temperature at least 2° C. below the melting point of the lowest melting peroxide to be included in the masterbatch composition, (c) adding 20–60 percent by weight, based on the weight of the mixture, of a peroxide initiator to the mixture, with mixing, while maintaining the temperature of the mixture at least 2° C. below the melting point of the lowest melting peroxide in the peroxide initiator until the peroxide is substantially intimately mixed with the mixture, (d) further mixing the mixture including peroxide in such a manner that the temperature rises sufficiently to melt the peroxide(s) in the mixture to obtain the masterbatch composition, and (e) discharging the masterbatch composition from the mixing device, is disclosed. Also disclosed is a masterbatch composition which can be made by this process and the use of such masterbatches in the cross-linking of rubbers.

6 Claims, No Drawings

FILLER-FREE PEROXIDE MASTERBATCH AND PROCESS FOR MAKING IT

The present invention relates to a process for the making of a peroxide masterbatch in blends of EP(D)M and polyoctenamer rubber and to masterbatches which can be made by such process.

From the Hüls Publikationen entitled, "VESTENAMER® ein ungewöhnlicher Kautschuk mit vielfältigen Möglichkeiten", Research Disclosure 335011 from March 1992, and *Kautsch. Gummi*, Kunst. st. 42, pp. 1130–1140 (1989) it is known that Vestenamer®, a trans-polyoctenamer rubber, can be used to make masterbatches of rubber additives, including peroxides, and that Vestenamer® has a low viscosity in comparison to other rubbers. Further, the compatibility of Vestenamer® with EP(D)M is also mentioned in the Huls publications.

In addition, masterbatches of peroxides in EP(D)M, including significant amounts of filler material, have been sold by Akzo and thus are known in the art.

European Patent application 227 048 discloses the use of blends of two polymers having different melt temperatures as the carrier for peroxide compounds such as dicumyl peroxide. This disclosure does not mention the present blends but suggests that polymer blends having certain properties make useful peroxide carriers. In particular, polymer blends having a melt index of 250–2500 grams/10 minutes, an average softening point of 50°–115° C. and having two distinct melting temperatures, are preferred.

Further, U.S. Pat. No. 4,737,547 discloses polyolefin mixtures which comprise reactive components in low concentrations. The carrier materials are homo- and copolymers of 2–10 carbon atom α-olefins. U.S. Pat. Nos. 4,397,992; 4,342,844 and 4,808,442 also disclose examples of peroxide masterbatches in polymers.

Finally, trans-polyoctenamer rubbers are known, in general from the publications, *Kautschuk+Gummi Kunststoffe* 34, Nr. 3/1981, pp. 185–190 and *Kautschuk+Gummi Kunststoffe* 42, Nr. 10/1989, pp. 868–874. The original nomenclature can be found in IUPAC-Information Bulletin Nr. 29 (1972).

A problem encountered with peroxide masterbatches is that large amounts of fillers are often required in order to make such masterbatches in rubbers due to the high viscosity of rubber compositions. However, users of the masterbatches often do not need fillers in their rubber products and thus would prefer masterbatches without fillers. Further, even if fillers are desired in the rubber, the users of peroxide masterbatches prefer not to be limited in their choice of filler by the presence of filler in the masterbatches. If the masterbatches do not contain filler, then the user of the masterbatch can freely choose which filler(s) he will employ.

Accordingly, the present invention is directed to a process and a masterbatch which overcomes the need for the use of fillers in the production of peroxide masterbatches. These and other objects of the present invention will be apparent from the summary and detailed description which follow.

SUMMARY OF THE INVENTION

The present invention relates, in a first aspect, to a process for the production of a peroxide masterbatch composition comprising the steps of:

a) providing a mixture of an ethylene-propylene copolymer and 10–150 parts by weight, based on the weight of the ethylene-propylene copolymer of a polyoctenamer rubber to a mixing device, b) adjusting the temperature of the mixture to a temperature at least 2° C. below the melting point of the lowest melting peroxide to be included in the masterbatch composition, c) adding 20–60 percent by weight, based on the weight of the mixture, of a peroxide initiator to the mixture, with mixing, while maintaining the temperature of the mixture at least 2° C. below the melting point of the lowest melting peroxide in the peroxide initiatior until the peroxide initiator is substantially intimately mixed with the mixture, d) further mixing the mixture including peroxide initiator in such a manner that the temperature rises sufficiently to melt the peroxide(s) in the mixture to obtain the masterbatch composition, and e) discharging the masterbatch composition from the mixing device.

In a second aspect, the present invention relates to a masterbatch composition comprising an ethylene-propylene copolymer, 10–150 parts by weight, based on the weight of the ethylene-propylene copolymer of a polyoctenamer rubber, and 20–60 percent by weight of a peroxide initiator, based on the total weight of the ethylene-propylene copolymer and the polyoctenamer rubber.

Finally, the present invention also relates to the use of a masterbatch as described above as a source of free radicals for the cross-linking of rubbers.

DETAILED DESCRIPTION OF THE PREFERRED EMBODIMENTS

In the first step of the process of the present invention, a mixture of an ethylene-propylene copolymer and 10–150 parts by weight, based on the weight of the ethylene-propylene copolymer, of a polyoctenamer rubber are provided to a mixing device.

The ethylene-propylene copolymer is selected from EPM and EPDM copolymers and mixtures thereof. The polyoctenamer rubber contains one or more rubbers as are described in the articles, "trans-Polyoctenamer," Dräxler, Marl A., *Kautschuk+Gummi Kunststoffe*, 34, Nr. 3/1981, pp. 185–190; and, "25 Jahre Polyoctenamer - der Entwicklungsgang eines Synthesekautschuks vom Laborpräparat zum industriellen Rohstoff," Dräxler, Marl A., *Kautschuk+Gummi Kunststoffe*, 42, Nr. 10/1989, pp. 868–874, which publications are hereby incorporated by reference herein.

The amount of polyoctenamer rubber, based on the ethylene-propylene copolymer is 10–150 parts by weight, more preferably 15–100 parts by weight and most preferably 20–40 parts by weight. The polyoctenamers useful in the present invention may contain both trans- and cis-double bonds in the polymer in any ratio. More preferred polyoctenamers contain more than 50% trans-double bonds, with the rest being cis-double bonds. The most preferred polyoctenamer rubber is Vestenamer®, a product of Hüls, having 80% trans- and 60% cis-double bonds in the polymer.

The mixing device employed in the process of the present invention may be any known device suitable for the mixing of rubbers, except that the device must be capable of sufficent heat dissipation to maintain the temperature of the masterbatch mixture below the melting point of the peroxide during the period in which the peroxide is substantially intimately mixed into the masterbatch. Particularly suitable devices are two-roll mills and certain extruders optionally provided with a cooling means to aid in the dissipation of heat. The two-roll mill is the preferred device for the process of the present invention.

The temperature at which the polyoctenamer rubber is mixed with the ethylene-propylene copolymer is not critical, and any temperature suitable for thorough mixing of the masterbatch, may be used. A particularly good temperature is generally from 80°–100° C. The temperature can be regulated by external or internal heating or cooling of the mixing device, the amount of mixing energy expended and the nip setting of the mill, for example. Generally, heating is accomplished by a vigorous mixing which leads to heat generation.

In the second step of the process of the present invention, the temperature of the mixture of the ethylene-propylene copolymer and the polyoctenamer rubber is adjusted to at least 2° C. below the melting temperature of the lowest melting peroxide to be included in the masterbatch. More preferably, the temperature is adjusted to at least 5° C. below the melting temperature of the lowest melting peroxide to be included in the masterbatch.

This temperature adjustment is critical since the peroxide must be mixed into the masterbatch at a temperature below its melting point in order to obtain substantially intimate mixing of the peroxide in the masterbatch. This temperature is maintained throughout the period of addition of the peroxide and for a short time thereafter in order to ensure the intimate mixing.

The temperature can be controlled by several means including internal or external cooling means, gradual dosing of the peroxide to the masterbatch over time, adjusting the mixing energy employed and adjusting the nip setting of the mill, if a mill is employed. Also, any combination of these means may be employed to maintain the required temperature.

Once the mixture of the ethylene-propylene copolymer and the polyoctenamer rubber is adjusted to the proper temperature, the peroxide is added to the masterbatch. The peroxide must be added in such a manner that the temperature of the masterbatch is not raised to the melting point of the peroxide. This can be accomplished, for example, by adding the peroxide gradually over a period of 5–30 minutes while mixing is continued.

The amount of peroxide employed is generally from 20–60% by weight, based on the total weight of the mixture of the ethylene-propylene copolymer and the polyoctenamer rubber. More preferably, the amount of peroxide employed is 30–50% by weight.

Peroxides which may be employed in the present process are, in general, peroxides used in the cross-linking of rubbers which have a melting point which is at least 15° C. below the decomposition temperature of the peroxide. Typical peroxides include bis(t-butylperoxyisopropyl) benzene and dicumyl peroxide.

Once the peroxide is substantially intimately mixed into the masterbatch, cooling of the mixing device is stopped and the mixing is further conducted in a manner whereby the temperature rises to a temperature above the melting temperature of the highest melting peroxide in the masterbatch composition. In this manner, all of the intimately mixed peroxide is melted in the masterbatch to further improve the dispersion in the masterbatch composition as well as to better bind the peroxide in the masterbatch so that it does not later bloom to the surface thereof.

The temperature should not be allowed to rise too high as such high temperatures will generally lead to undesirable decomposition of the peroxide. Thus, it is generally desirable not to let the temperature rise to more than about 10° C. above the melting point of the highest melting peroxide in the masterbatch.

In this regard, it should be noted that two or more peroxides cannot be mixed in a single masterbatch unless the melting points of both peroxides are well below (at least 10° C.) the lowest decomposition temperature of the peroxides. In general, masterbatches containing only a single peroxide are preferred in the present invention.

Finally, the masterbatch composition is discharged from the mixing device and allowed to cool to room temperature. The masterbatch may then be further processed into, for example, sheets or pellets, if desired.

The present process provides a peroxide masterbatch in rubber which can be processed at low temperatures without significant peroxide decomposition. Further, the present process provides the option to produce filler-free peroxide masterbatches in rubber.

The masterbatch product of the present invention exhibits two important advantages over prior art masterbatches. First, it exhibits less blooming of peroxide to the masterbatch surface than other filler-free peroxide masterbatches. Second, the caking of the present masterbatches is less when compared to the most similar prior art masterbatches. For these reasons, the present process and the masterbatches made therefrom are considered to be a significant improvement in the rubber cross-linking field.

In a second aspect, the present invention relates to a peroxide masterbatch composition comprising an ethylene-propylene copolymer, 10–150 parts by weight, based on the weight of the ethylene-propylene copolymer of a polyoctenamer rubber, and 20–60 percent by weight of a peroxide initiator, based on the total weight of the ethylene-propylene copolymer and the polyoctenamer rubber. These masterbatches may be made by any suitable process including the process of the present invention.

The preferred masterbatches in accordance with the present invention are also filler-free (i.e. they do not contain any known rubber filler materials in addition to the ingredients specified above). This provides a substantial advantage for users of these masterbatches since they need not incorporate unwanted filler materials into their rubber products via the peroxide masterbatches and the users can purchase and ship smaller absolute quantities of the masterbatches since they no longer need to pay for or ship the additional filler materials which are often included in such masterbatches.

Even more preferred masterbatches include, based on the ethylene-propylene copolymer, 15–100 parts by weight of polyoctenamer rubber, and more preferably 20–40 parts by weight. The amount of peroxide employed is generally from 20–60% by weight, based on the total weight of the mixture of the ethylene-propylene copolymer and the polyoctenamer rubber. More preferably, the amount of peroxide employed is 30–50% by weight.

Peroxides which may be employed in the present masterbatch are, in general, peroxides used in the cross-linking of rubbers which have a melting point which is at least 15° C. below the decomposition temperature of the peroxide. Typical peroxides include bis(t-butylperoxyisopropyl) benzene and dicumyl peroxide.

The most preferred peroxide masterbatches of the present invention are those which are made by the process of the present invention. All of the peroxide masterbatches of the present invention are useful in the cross-linking of rubber products.

The peroxide masterbatches of the present invention generally exhibit improved anti-caking properties and less blooming than comparable prior art peroxide masterbatches.

Finally, the present invention also embodies the use of the above-described peroxide masterbatches as a source of free radicals in the cross-linking of rubbers. This use can be carried out by methods generally known in the art. In the use, several advantages are apparent from the fact that the masterbatches exhibit less blooming and caking and from the preferred masterbatches which do not contain unwanted filler materials.

The following examples are presented to further illustrate the invention.

EXAMPLE 1

On a two-roll mill with both rolls internally cooled with water and a friction setting of 1:1.2, set to a nip setting of 2.3, 85 parts of EPDM is milled to warm up the rolls to a temperature of 70° C. Then, 15 parts of Vestenamer®, a trans-polyoctenylene rubber, were added while mixing was continued on the two-roll mill. Then, the two-roll mill was cooled to a temperature of 39° C. over a twenty minute period. Then, 40% by weight of bis(tertiary-butylperoxy isopropyl) benzene was added gradually over a period of about 10 minutes with continued cooling and after adjustment of the nip setting of the two-roll mill to 3.5. In this manner, the temperature was maintained at about 39° C. and the peroxide, in solid form, was intimately mixed into the masterbatch.

Cooling was then discontinued and mixing was continued to allow the temperature to rise to a maximum of about 10° C. above the melting point of the peroxide, in this case 54°–58° C. This took about 6 minutes. In this manner, substantially all of the peroxide was melted into the masterbatch. Finally, the nip setting was reset to 2.3 and the mixture was discharged from the two-roll mill after about two minutes.

A good, filler-free peroxide masterbatch was obtained having a melt flow index of 0.1 g/10 minutes (2.16 kg, 190° C.) (DIN 53735) or 11 g/10 minutes (21.6 kg, 190° C.). The masterbatch exhibited no softening point between 50°–300° C. and had a single melting temperature of 55° C.

EXAMPLE 2

A masterbatch was prepared in accordance with the procedure of Example 1 except that dicumyl peroxide was substituted for the bis (tertiary-butylperoxy isopropyl) benzene and the temperature of the EPDM/Vestenamer® mixture was adjusted to 33° C. over a twenty minute period prior to addition of the peroxide. Finally, the temperature was later allowed to rise to 45°–50° C. to melt the peroxide in the masterbatch. A good, filler-free peroxide masterbatch was obtained.

The masterbatches of Examples 1–2 were compared to prior art products containing fillers in a caking test. In particular, a cylinder is filled with 30 g. of masterbatch and a plunger with a load of 45 g/cm² is applied for 24 hours on top of the sample in the cylinder at the temperatures given in Table 1. The cylinder is then carefully emptied and visually inspected for caking.

In Table 1, a comparison is made between the masterbatch of Example 1 and a commercially available masterbatch containing 40% by weight of bis(tertiary-butylperoxy isopropyl) benzene, 28% EPDM, 27% inert filler and 5% of other materials (Example A). Also in Table 1, a comparison is made between the masterbatch of Example 2 and a commercially available masterbatch composition comprising 40% by weight of dicumyl peroxide, 30% EPDM and 30% inert filler material (Example B). None of the masterbatches were surface treated with talc prior to the caking test.

TABLE 1

| Masterbatch | Temperature (°C.) | | |
| --- | --- | --- | --- |
| | 20° C. | 30° C. | 40° C. |
| Example 1 | 100% caked, very loose. | 100% caked, reasonably loose. | 100% caked, reasonably loose. |
| Example A | 100% caked, slightly sticky. | 100% caked, very sticky. | 100% caked, packed solid and stringy. |
| Example 2 | 100% caked, very loose. | 100% caked, stringy in middle, slightly sticky. | 100% caked, stringy in middle, slightly sticky. |
| Example B | 100% caked, extremely sticky and doughy. | 100% caked, extremely sticky and doughy. | 100% caked, extremely sticky and doughy. |

As can be seen from Table 1, the masterbatches of the present invention suffered far less from caking than the commercially available masterbatches containing fillers.

A further comparison of the masterbatch of Example 2 with the commercially available masterbatch of Example B was made after surface treating both masterbatches with talc, a known treatment for the reduction of caking in peroxide masterbatches. It was found that the masterbatch of Example 2 was only 65% caked and very loose at 20° C., 100% caked and very loose at 30° C. and 100% caked and reasonably loose at 35° C. The commercially available masterbatch of Example B was 100% caked and very loose at 20° C., 100% caked and very loose at 30° C., but at 35° C. it was 100% caked and reasonably solid. Accordingly, even after treatment with talc, the masterbatches of the present invention exhibit less caking than the filler-containing, commercially available masterbatches.

EXAMPLE 3

A masterbatch was prepared in accordance with the procedure of Example 1 except that 60 parts of EPDM and 40 parts of Vestenamer® were employed. A good masterbatch was obtained with a melt flow index of 40 g/10 minutes (21.6 kg, 190° C.), an average softening point of about 200° C. and a single melt temperature of 55° C.

EXAMPLE 4

The masterbatches of Examples 1–2 were then compared with filler-free masterbatches of peroxides where only EPDM was employed (i.e. all Vestenamer® was replaced by EPDM). The masterbatches based on pure EPDM exhibited significant blooming as evidenced by peroxide crystals appearing on the surface of the masterbatches. This phenomena is particularly undesirable since these peroxide crystals tend to collect in the bottom of the packages of masterbatch leading to safety hazards and significant loss of active oxygen in the masterbatches. The masterbatches of the present invention exhibited no significant blooming and no peroxide crystals could be detected on the smooth masterbatch surface.

The foregoing examples have been presented for the purposes of illustration and description only and are not to be construed as limiting the invention in any way. The scope of the invention is to be determined from the claims appended hereto.

What is claimed is:

1. A process for the production of a peroxide masterbatch composition which comprises:
   a) providing a mixture of an ethylene-propylene copolymer and 10–150 parts by weight, based on the weight of the ethylene-propylene copolymer of a polyoctenamer rubber to a mixing device,
   b) adjusting the temperature of said mixture to a temperature at least 2° C. below the melting point of the lowest melting peroxide to be included in the masterbatch composition,
   c) adding 20–60 percent by weight, based on the weight of said mixture, of a peroxide initiator to said mixture, with mixing, while maintaining the temperature of the mixture at least 2° C. below the melting point of the lowest melting peroxide in the peroxide initiator until the peroxide initiator is substantially intimately mixed with said mixture,
   d) further mixing said mixture including peroxide initiator in such a manner that the temperature rises sufficiently to melt the peroxide(s) in the mixture to obtain the masterbatch composition, and
   e) discharging the masterbatch composition from the mixing device.

2. The process of claim 1 wherein 15–100 parts by weight of polyoctenamer rubber, based on the weight of the ethylene-propylene copolymer, are employed and 30–50 percent by weight of peroxide, based on the weight of said mixture, is employed.

3. The process of claim 1 wherein the temperature of said mixture is maintained at least 5° C. below the melting point of the lowest melting peroxide in the peroxide initiator for steps (b)–(c) of the process.

4. The process of claim 1 wherein the mixing device is selected from extruders and two-roll mills.

5. The process of claim 1 wherein said ethylene-propylene copolymer is mixed and heated prior to addition of said polyoctenamer rubber thereto, and said mixture thereof is subsequently cooled to adjust the temperature.

6. The process of claim 1 wherein said ethylene-propylene copolymer is selected from EPM or EPDM and wherein said peroxide is selected from bis (t-butylperoxyisopropyl) benzene or dicumyl peroxide.

* * * * *